(12) United States Patent
Hayakawa et al.

(10) Patent No.: US 12,312,874 B2
(45) Date of Patent: May 27, 2025

(54) CONNECTION DEVICE FOR TUBULAR ELEMENTS

(71) Applicants: VALLOUREC OIL AND GAS FRANCE, Aulnoye-Aymeries (FR); NIPPON STEEL CORPORATION, Tokyo (JP)

(72) Inventors: Ryunosuke Hayakawa, Tokyo (JP); Sébastien Villert, Meudon-la-Foret (FR)

(73) Assignees: VALLOUREC OIL AND GAS FRANCE, Aulnoye-Aymeries (FR); NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/570,981

(22) PCT Filed: Jun. 6, 2022

(86) PCT No.: PCT/EP2022/065304
§ 371 (c)(1),
(2) Date: Dec. 15, 2023

(87) PCT Pub. No.: WO2022/263218
PCT Pub. Date: Dec. 22, 2022

(65) Prior Publication Data
US 2024/0209695 A1 Jun. 27, 2024

(30) Foreign Application Priority Data

Jun. 17, 2021 (FR) ..................................... 21 06436

(51) Int. Cl.
*E21B 17/042* (2006.01)
*F16L 15/00* (2006.01)
*F16L 15/06* (2006.01)

(52) U.S. Cl.
CPC .......... *E21B 17/042* (2013.01); *F16L 15/004* (2013.01); *F16L 15/06* (2013.01)

(58) Field of Classification Search
CPC ......... F16L 15/004; F16L 15/06; F16L 15/04; F16L 15/08; E21B 17/042
See application file for complete search history.

(56) References Cited

U.S. PATENT DOCUMENTS

| 3,854,760 A | 12/1974 | Duret | |
|---|---|---|---|
| 4,762,344 A * | 8/1988 | Perkins | F16L 15/04 285/333 |
| 8,882,157 B2 * | 11/2014 | Chelette | F16L 15/004 285/333 |

(Continued)

OTHER PUBLICATIONS

International Search Report issued Aug. 26, 2022 in PCT/EP2022/065304 filed on Jun. 6, 2022, 2 pages.

*Primary Examiner* — David Bochna
(74) *Attorney, Agent, or Firm* — Oblon, McClelland, Maier & Neustadt, L.L.P.

(57) ABSTRACT

A connection device includes a first tubular element, a second tubular element, and a coupling sleeve in order to connect the first tubular element and the second tubular element. A first male portion of the first tubular element includes a free end which has an annular sealing lip. The sealing lip covers an outer sealing surface of the second tubular element. The sealing lip has an outer periphery on which an outer thread is provided.

12 Claims, 2 Drawing Sheets

(56) References Cited

U.S. PATENT DOCUMENTS

| | | | |
|---|---|---|---|
| 9,004,544 B2* | 4/2015 | Carcagno | F16L 15/004 |
| | | | 285/333 |
| 11,940,064 B2* | 3/2024 | Owoeye | F16L 15/06 |
| 2006/0273586 A1 | 12/2006 | Reynolds, Jr. et al. | |
| 2012/0074692 A1 | 3/2012 | Chelette et al. | |
| 2015/0061288 A1 | 3/2015 | Chelette et al. | |
| 2017/0198839 A1 | 7/2017 | Chelette et al. | |

* cited by examiner

CONNECTION DEVICE FOR TUBULAR ELEMENTS

TECHNICAL FIELD

The invention concerns a connection device which makes it possible to assure sealed coupling between two tubular elements. In particular, the invention relates to the connection devices which are designed to be used in gas or petroleum wells in order to constitute a drilling fitting, a casing pipe column or a pipework column, or also a production pipe column.

TECHNOLOGICAL BACKGROUND

Connection devices are known in the prior art which are designed to be used in gas or petroleum wells, and comprise a first tubular element, a second tubular element, and a coupling sleeve in order to couple the first and second tubular elements to one another in a sealed manner. Each of the tubular elements comprises a threaded male portion which is screwed to the interior of a threaded female portion of the coupling sleeve.

Connection devices of this type are known wherein the coupling sleeve comprises a heel which projects radially towards the interior. A connection device of this type is described for example in document FR3027649. The heel has two axial stop surfaces which are designed to cooperate with corresponding axial stop surfaces provided at the free ends of the first and second tubular elements. The sleeve also has two sealing surfaces which cooperate with corresponding sealing surfaces of the first and second tubular elements. Connection devices of this type are not totally satisfactory, in particular since, because of their heel and the two sealing surfaces, their coupling sleeve is complex and costly to machine.

Document US2012/0074692 solves this problem by proposing a connection device wherein the stop and sealing functions are provided between the two free ends of the two tubular elements which are screwed to the interior of the coupling sleeve. For this purpose, the free ends of the first and second tubular elements comprise axial stop surfaces. In addition, the free end of one of the tubular elements comprises an annular sealing lip which interferes against a frusto-conical sealing surface provided on the outer surface of the other one of the tubular elements in order to assure the sealing of the connection when the axial stop surfaces are in contact against one another. However, a connection device of this type is not fully satisfactory either. In fact, the axial stop surfaces must have dimensions which are sufficient to withstand the substantial clamping torques which are applied when one of the tubular elements is screwed to the interior of the coupling sleeve, until its axial stop surface comes into contact with the axial stop surface of the other tubular element. Consequently, the annular sealing lip can be produced only with a small quantity of material, which makes it particularly fragile, and does not make it possible to guarantee the reliability of the contact between the sealing lip and the corresponding frusto-conical sealing surface.

SUMMARY

A concept on which the invention is based consists of proposing a connection device of the aforementioned type which is simpler to produce, while assuring the sealing of the connection reliably.

According to one embodiment, the invention provides a connection device comprising a first tubular element, a second tubular element and a coupling sleeve in order to connect the first tubular element and the second tubular element, the coupling sleeve having a first female portion and a second female portion having respectively a first inner thread and a second inner thread, the first tubular element and the second tubular element having respectively a first male portion and a second male portion, the first male portion and the second male portion having respectively a first outer thread which is designed to cooperate with the first inner thread of the coupling sleeve, and a second outer thread which is designed to cooperate with the second inner thread of the coupling sleeve, such as to permit coupling by screwing of the first male portion to the interior of the first female portion and of the second male portion to the interior of the second female portion, the first male portion comprising a free end having a first axial stop surface, the second male portion having a free end comprising a second axial stop surface and an outer sealing surface extending between the second axial stop surface and the second outer thread, the second axial stop surface being designed to come into contact against the first axial stop surface when the first male portion and the second male portion are coupled respectively in a coupling position to the interior of the first female portion and the second female portion, the free end of the first male portion also comprising an annular sealing lip, projecting axially relative to the first axial stop surface, the sealing lip being configured to cover the outer sealing surface and to come into sealed radial contact against the said outer sealing surface when the first axial stop surface and the second axial stop surface are in contact against one another, the sealing lip having an outer periphery on which part of the first outer thread is provided.

A connection device with the aforementioned characteristics is particularly advantageous in that it makes it possible to simplify the production of the coupling sleeve, since the sealing is provided between the first and second tubular elements. In addition, thanks to the presence of the first outer thread on the sealing lip, the quantity of material which constitutes the said sealing lip is substantial. As a result of this substantial quantity of material in order to provide the sealing lip, the lip has satisfactory rigidity for assuring the sealed contact with the outer sealing surface, and for guaranteeing the sealing of the device.

According to some embodiments, a connection device of this type can comprise one or a plurality of the following characteristics.

According to one embodiment, the first outer thread has a conical portion and a cylindrical portion, the said cylindrical portion being positioned axially between the conical portion and the free end of the first male portion, such that the cylindrical portion is at least partly arranged on the sealing lip. Thanks to these characteristics, the sealing lip has a greater radial thickness, thus contributing towards its rigidity, and therefore to the reliability of the sealing of the device.

According to one embodiment, the first inner thread which is designed to cooperate with the cylindrical portion of the first outer thread is conical.

According to one embodiment, the cylindrical portion of the first outer thread and the first conical inner thread cooperate with interference, preferably with axial interference, such as to assure a self-blocking effect.

For this purpose, according to one embodiment, the first outer thread comprises threading which has an engagement flank facing towards the free end of the first male portion, and a support flank facing in the opposite direction, the first outer thread comprising, in the coupling position, an area which is stressed axially, extending, starting from the free end of the said male portion, between a first area in which axial interference begins between the engagement flank and a corresponding surface of the first inner thread, and a second area starting from which the engagement flank is not in interference against a corresponding surface of the first inner thread, whereas the support flank is in interference against a corresponding area of the said first inner thread.

According to one embodiment, the area which is stressed axially comprises between 1 and 4 teeth.

According to one embodiment, one out of the first male portion and the second male portion is a factory end, and the other one is a site end, the factory end being designed to be coupled to the coupling sleeve before the site end.

According to an advantageous embodiment, the first male portion forms the factory end and the second male portion forms the site end. Alternatively, the first male portion forms the site end and the second male portion forms the factory end.

According to one embodiment, the coupling sleeve comprises an additional axial stop surface which projects radially towards the interior of the coupling sleeve, from a median portion situated between the first inner thread and the second inner thread, the sealing lip being designed to come into axial contact against the said additional axial stop surface when the first male portion is in the coupling position.

According to one embodiment, the first tubular element comprises a visual marker arranged at a predetermined distance from the first axial stop surface. A visual marker of this type makes it possible to assure a predetermined relative positioning of the first tubular element relative to the coupling sleeve.

According to one embodiment, an end tooth of the first outer thread is designed to come into contact against the additional axial stop surface in the coupling position. In other words, the tooth of the first outer thread which is situated closest to the free end of the sealing lip is designed to cooperate with the additional axial stop surface. According to one embodiment, a radial height of the additional stop surface is equal to, or greater than, half a radial height of the said end tooth. According to one embodiment, the radial height of the additional stop surface is equal to, or smaller than, the radial height of the said end tooth.

According to one embodiment, the second outer thread is frusto-conical, and the second inner thread is frusto-conical.

According to one embodiment, the coupling sleeve comprises a median portion without a thread which is positioned between the first inner thread and the second inner thread. A median portion of this type is advantageous in that it defines a free volume which can receive surplus grease.

According to one embodiment, the median portion has an axial length which is equal to, or greater than, one times, and preferably greater than two times, a thread pitch of the first outer thread. A thread pitch of this type is for example the distance which separates the engagement flanks or the support flanks of two successive teeth of the first outer thread. A length of this type of the median portion provides a substantial quantity of free volume to accommodate the first outer thread.

According to one embodiment, in the coupling position, an end of the median portion is interposed axially between a free end of the sealing lip and the first axial stop surface. Preferably, the axial distance which separates the first axial stop surface from the said end of the median portion is equal to, or smaller than, one times the thread pitch of the first outer thread. Thanks to these characteristics, the concentration of stress in the radius of the top of the stop is reduced. In addition, these characteristics provide good axial stability of the sealing lip, and thus better reliability of the sealing of the connection.

According to one embodiment, the median portion forms a recess, the first outer thread being partly accommodated in the said recess.

According to one embodiment, the said median portion is positioned such that, when the first axial stop surface and the second axial stop surface are in contact against one another, the sealing lip is in radial contact against the outer sealing surface which is radially in the interior of the median portion.

According to one embodiment, the sealed radial contact between the sealing lip and the outer sealing surface when the first axial stop surface and the second axial stop surface are in contact with one another takes place with radial interference, measured in mm, which is equal to, or greater than, two times the radial distance which separates the first outer thread and the median portion of the coupling sleeve. Preferably, this distance between the first outer thread and the said median portion is measured at the end tooth of the first outer thread.

According to one embodiment, the sealed radial contact between the sealing lip and the outer sealing surface, when the first axial stop surface and the second axial stop surface are in contact with one another, takes place with radial interference which deforms the sealing lip radially towards the exterior, such that the first outer thread is in contact with the median portion of the coupling sleeve. Contact of this type provides good radial stability of accommodation of the sealing lip against the median portion, thus assuring good reliability of the sealing.

According to one embodiment, the first tubular element, the second tubular element and the coupling sleeve are made of steel.

According to one embodiment, the first outer thread is in contact against the first inner thread on areas of interference having a level of interference which is greater, and advantageously more than 10% greater, than the level of interference of the second outer thread against the second inner thread. A level of interference of this type is for example associated with a depth of interference measured in mm, or also with a measurement of the surfaces which are in interference. Thus, the clamping torque of the first male portion is greater than that of the second male portion, which makes it possible to prevent the first male portion from becoming unscrewed from the coupling sleeve during the screwing of the second male portion.

BRIEF DESCRIPTION OF THE FIGURES

The invention will be better understood, and other objectives, details, characteristics and advantages thereof will become more clearly apparent, from the following description of a plurality of particular embodiments of the invention, provided purely by way of non-limiting illustration, with reference to the appended drawings.

DESCRIPTION OF THE EMBODIMENTS

Figure 1:
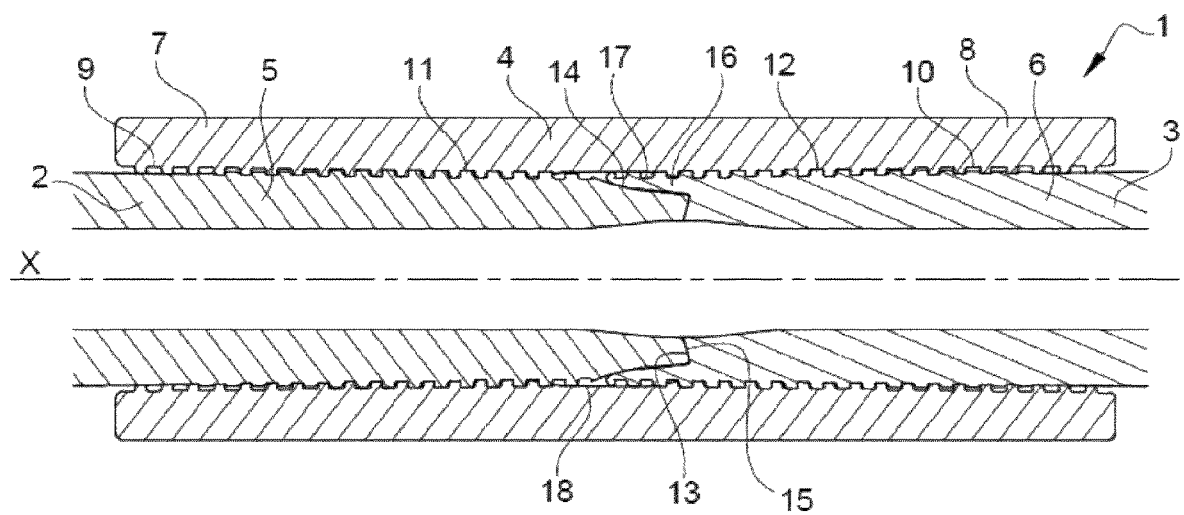
FIG. 1 is a view in cross-section of a connection device according to one embodiment.

In the description and the figures, the axis X corresponds to the axis of screwing of the tubular elements of the connection device. By convention, the "radial" orientation is directed orthogonally to the axis X, and the axial orientation is directed parallel to the axis X. The terms "outer" and "inner" are used to define the relative position of an element with reference to the axis X, and an element close to the axis X is thus qualified as inner as opposed to an outer element situated radially on the periphery.

In relation with FIGS. 1 and 2, a description is provided hereinafter of a connection device 1 according to a first embodiment. The connection device 1 comprises a first tubular element 3, a second tubular element 2, and a coupling sleeve 4 making it possible to connect the said tubular elements 1, 3 to one another in a sealed manner. The tubular elements 2, 3 and the coupling sleeve 4 are typically made of steel.

Each tubular element 2, 3 comprises two ends, a single one of which is represented in FIG. 1, which ends are each equipped with a male portion 5, 6 designed to be screwed into a corresponding female portion 7, 8 of the coupling sleeve 4. Thus, it is possible to connect to one another in a sealed manner a plurality of tubular elements 2, 3 one after another, for example in order to form a drilling fitting, a casing pipe column or a pipework column, or also a production pipe column for a gas or petroleum well.

The male portions 5, 6 each comprise an outer thread 11, 12 which is designed to cooperate with the inner thread 9, 10 of one of the female portions 7, 8 of the coupling sleeve 4. More particularly, the male portion 6 of the first tubular element 3 comprises a first outer thread 12 which is designed to cooperate with a first inner thread 10 of the coupling sleeve 4, and the male portion 5 of the second tubular element 2 comprises a second outer thread 11 which is designed to cooperate with a second inner thread 9 of the coupling sleeve 4. Advantageously, the coupling sleeve 4 comprises a median portion 18 which is positioned between the first inner thread 10 and the second inner thread 9, and which thus defines a free volume designed to receive the surplus grease. In the example represented, the median portion 18 has a diameter which is substantially equal to the diameter of the base of the first adjacent threadings of the first and second inner threads 9, 10 of the coupling sleeve 4. According to a variant embodiment, the median portion can also have a diameter which is slightly smaller than the diameter of the base of the first adjacent threading of the first inner thread 10 of the coupling sleeve 4, which makes it possible to increase further the self-blocking effect, described hereafter, of the male portion 6 of the first tubular element 3, in the said coupling sleeve 4.

In the embodiment described hereinafter, the male portion 6 of the first tubular element 3 is designed to be screwed to the interior of the coupling sleeve 4 before the male portion 5 of the second tubular element 2 is screwed. Thus, the male portion 6 of the first tubular element 3 can for example be pre-assembled in the factory with the coupling sleeve 4, whereas the male portion 5 of the second tubular element 2 is assembled with the coupling sleeve 4 only in a second stage, in situ in the installation site of the gas or petroleum well. In such a case, the male portion 6 of the first tubular element 3 is generally designated by the expression "factory end" or "mill end", whereas the male portion 5 of the tubular element 2 is designated by "site end" or "field end". In order to prevent the first tubular element 6 from being unscrewed from the coupling sleeve 4 during the screwing of the second tubular element 2, the clamping torque of the first tubular element 3 in the coupling sleeve 4 caused by the cooperation of the first outer thread 12 with the first inner thread 10 of the coupling sleeve 4 is greater than the clamping torque of the second tubular element 2 caused by the cooperation of the second outer thread 11 with the second inner thread 9 of the coupling sleeve 4, and preferably more than 10% greater. For this purpose, in the stop position also known as the coupling position, the threading of the first outer thread 12 is in contact against the threading of the first inner thread 10 on interference areas, the surface area of which is greater, and advantageously more than 10% greater, then the surface area of the areas of interference of the threading of the second outer thread 11 against the threading of the second inner thread 9. In an alternative or complementary manner, in the coupling position, the threading of the first outer thread 12 is in contact against the threading of the first inner thread 10, with a level of interference measured in mm which is greater than, and preferably more than 10% greater than, the level of interference measured in mm of the threading of the second outer thread 11 against the threading of the second inner thread 9.

Figure 2:
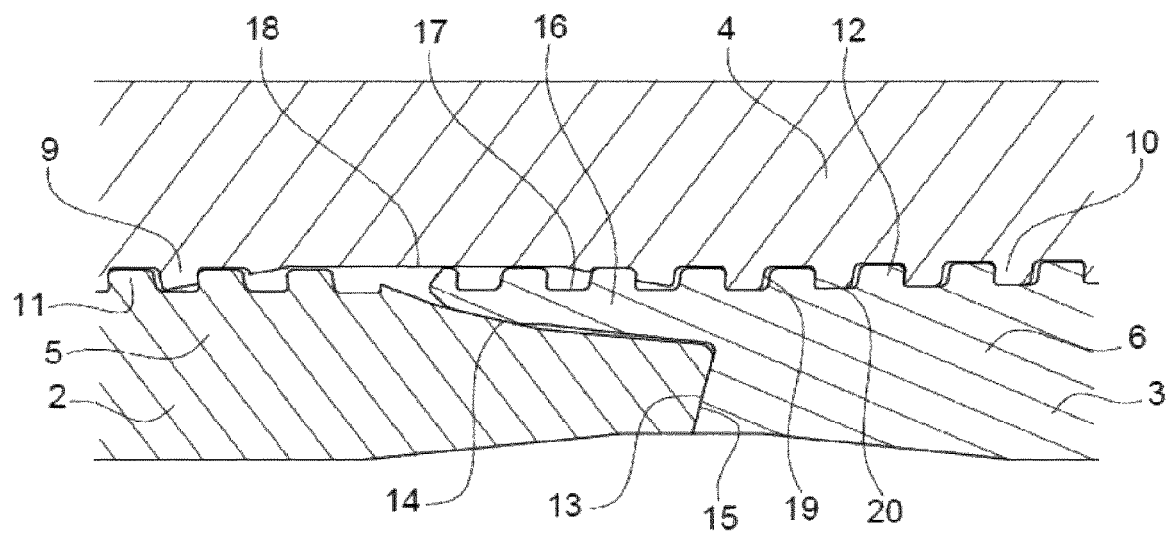
FIG. 2 is a detailed view in cross-section of the connection device of FIG. 1 according to a first variant embodiment.

In the embodiment in FIGS. 1 and 2, the first inner thread 10 of the coupling sleeve 4 is frusto-conical, such that the first inner thread 10 as an angle of inclination relative to the axis X. In other words, the diameter of the threading of the first inner thread 10 of the coupling sleeve 4 increases from the median portion 18 of the coupling sleeve 4 in the direction of the end of the coupling sleeve 4 situated on the side of the said first inner thread 10. The first outer thread 12 of the tubular element 3 for its part is cylindro-conical. In other words, the first outer thread 12 comprises a frusto-conical portion wherein the diameter of the threading decreases in the direction of the free end of the male portion 6 of the first tubular element 3, then continues with a cylindrical portion, wherein the diameter of the threading remains constant as far as the free end of the said male portion 6.

According to an advantageous embodiment, the length of the cylindrical portion of the first outer thread 12 is sufficient to obtain a self-blocking effect, i.e. an increase in the clamping torque by interference during the coupling of the first outer thread 12 in the first inner thread 10. Thus, for a predetermined clamping torque, it is possible to determine, to within the production tolerances, the relative position of the male portion 6 in the interior of the coupling sleeve 4 depending on the torque. In practice, the male portion 6 of the first tubular element 3 is screwed to the interior of the coupling sleeve 4 until a threshold clamping torque is obtained, which makes it possible to guarantee a predetermined relative positioning of the first element relative to the coupling sleeve 4.

As represented in FIG. 2, the threadings of the first and second outer threads 11, 12 are each defined by an engagement flank 19, designated as the "stabbing flank", and a support flank 20 which is designated as the "loading flank". The engagement flank 19 is placed upstream from the support flank 20. In other words, the engagement flank 19 of the first outer thread 12 faces towards the free end of the first tubular element 3, whereas the support flank 20 faces in the direction opposite the said free end.

Figure 3:
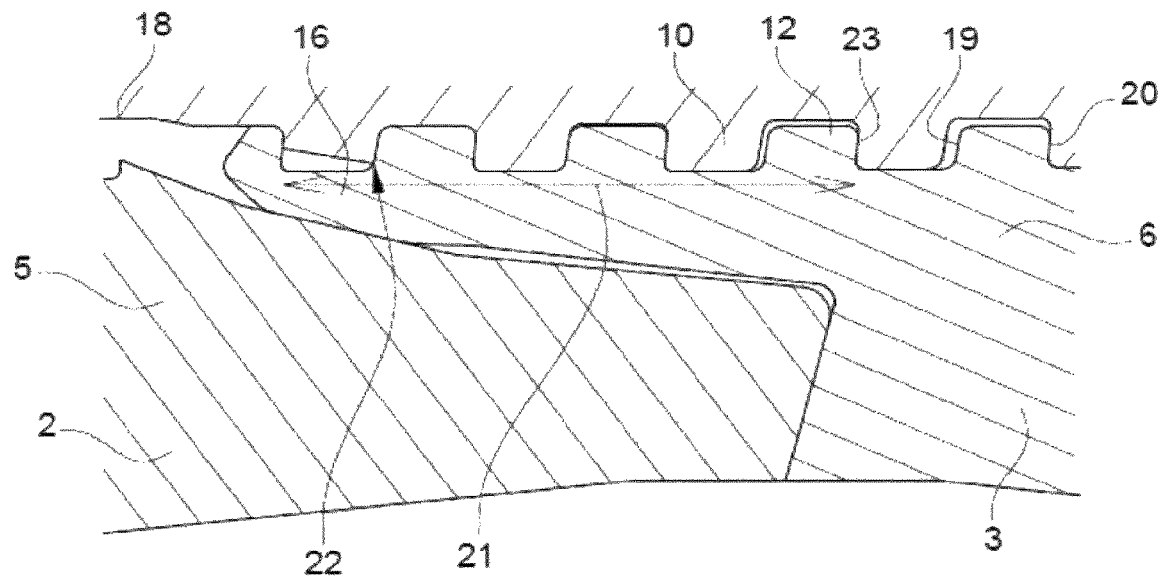
FIG. 3 is a detailed view in cross-section of the connection device of FIG. 1 according to a second variant embodiment.

As illustrated in relation with the embodiment of FIG. 3, in order to obtain the aforementioned self-blocking effect as a result of the respectively frusto-conical and cylindro-conical forms of the first inner thread 10 and the first outer thread 12, the first outer thread 12 has an axial stress area 21. This axial stress area extends, from upstream in the downstream direction, between a first area 22 in which interference begins between the engagement flank 19 and a corresponding surface of the first inner thread 10, and a second area 23, starting from which the engagement flank 19 is no longer in interference against a corresponding surface of the first inner thread 10, whereas the support surface 20 for its part is in interference against a corresponding area of the first inner thread 10. Preferably, this axial stress area 21 comprises between 1 and 4 teeth, with each tooth corresponding to a portion of the threading extending 360° around the axis X. In other words, this axial stress area 21 corresponds to a portion of the threading of the first outer thread 12 which extends over an angular range of between 360° and 1440° around the axis X. This makes it possible to assure a satisfactory self-blocking effect, in particular for the screwing of the factory end. In addition, this assures better axial stability of the sealing lip 16 described hereinafter.

According to other embodiments, the first inner thread 10 and the first outer thread 12 do not have the aforementioned structure assuring a self-blocking effect. In such a case, it is possible to equip the first tubular element 3 with a visual marker which is positioned at a predetermined distance from the free end of its male portion 6, and thus makes it possible to assure a predetermined relative positioning of the first tubular element 3 relative to the coupling sleeve 4.

In addition, the second inner thread 9 of the coupling sleeve 4, as well as the second outer thread 11 of the second tubular element 2 are frusto-conical. Thus, the diameters of the threading of the second inner thread 9 of the coupling sleeve 4 increases from the median portion 18 of the coupling sleeve 4 towards one of the ends of the coupling sleeve 4, whereas the diameter of the threading of the outer thread 11 of the second tubular element 2 decreases in the direction of the free end of the second tubular element 2.

As represented in a detailed manner in FIG. 2, the free end of the male portion 6 comprises a first axial stop surface 15 and a sealing lip 16 with an annular form, which projects axially relative to the first axial stop surface 15, radially on the exterior thereof. The free end of the male portion 5 of the second tubular element 2 comprises a second axial stop surface 13 and an outer sealing surface 14 which extends between the second axial stop surface 13 and the second outer thread 11. The outer sealing surface 14 extends slanting relative to the axis X, such that the diameter of the male portion 5 decreases from the second outer thread 11 towards the second axial stop surface 13.

Thus, during the screwing of the male portion 5 of the second tubular element 2 to the interior of the coupling sleeve 4, the second axial stop surface 13 abuts axially the first axial stop surface 15, which makes it possible to detect that the second tubular element 2 has reached the desired predetermined position.

In addition, the sealing lip 16 comes into contact against the outer sealing surface 14, which makes it possible to assure sealing between the first and second tubular elements 2, 3.

More particularly, the sealing lip 16 has an inner surface comprising a sealing bearing surface, which is also known as the sealing surface of the sealing lip 16. The inner surface of the sealing lip 16 is machined such that, during the screwing of the second tubular element 2 to the interior of the coupling sleeve 4, the outer sealing surface 14 is placed against the sealing support surface of the inner surface of the sealing lip 16, and deforms the said sealing support surface of the sealing lip 16 resiliently. This contact with interference makes it possible to assure the sealing between the outer sealing surface 14 and the sealing lip 16.

In the embodiment represented, the first and second axial stop surfaces 13, 15 have complementary frusto-conical forms. More particularly, the first axial stop surface 15 has a frusto-conical form oriented such that the radial cross-section of the first axial stop surface 15 decreases in the direction of the end of the first male portion 6, whereas the second axial stop surface 13 has a frusto-conical form oriented such that the radial cross-section of the second axial stop surface 13 increases in the direction of the end of the second male portion 5. According to an advantageous embodiment, the complementary frusto-conical forms have a half-angle at the top which is smaller than 90° and advantageously larger than 70°, for example approximately 75°. When the said axial stop surfaces 13, 15 cooperate, these inclinations of the first and second axial stop surfaces 13, 15 tend to force the outer sealing surface 14 against the sealing lip 16, and thus to guarantee satisfactory sealed contact.

As represented in FIGS. 1 and 2, the sealing lip 16 has an outer periphery 17 on which part of the first outer thread 12 is provided. An arrangement of this type is particularly advantageous in that it makes it possible to reinforce the sealing lip 16 by increasing the quantity of material which constitutes it. Advantageously, the quantity of material which constitutes the sealing lip 16 is even greater as a result of the cylindrical form of the first outer thread 12 at the end of the first male portion 6.

It should be noted that, in an alternative embodiment, the structure of the free ends of the first and second male portions 5, 6 is inverted, such that the sealing lip 16 is provided on the male portion 5, whereas the outer sealing surface 14 is provided on the male portion 6.

Figure 4:
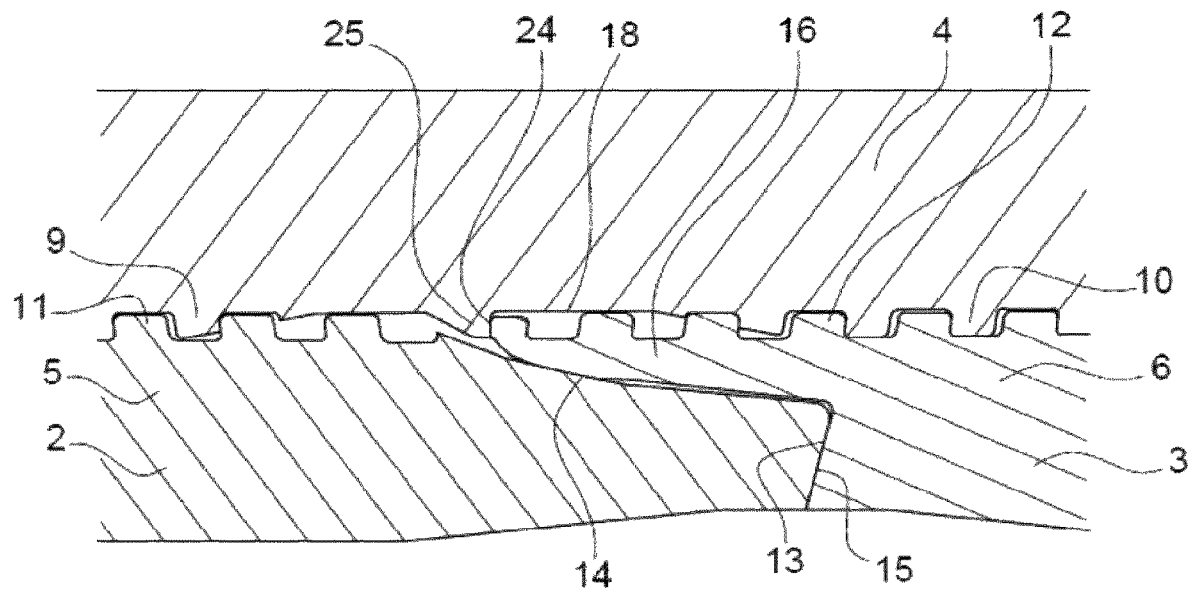
FIG. 4 is a detailed view in cross-section of the connection device of FIG. 1 according to a third variant embodiment.

FIG. 4 illustrates another embodiment wherein the coupling sleeve 4 comprises an additional axial stop surface 24 which is provided in the median portion 18 of the said coupling sleeve 4, and against which the end of the sealing lip 16 is designed to come into contact when the first tubular element 3 is screwed to the interior of the coupling sleeve 4. An additional axial stop surface 24 of this type makes it possible to guarantee predetermined relative positioning of the first tubular element 3 relative to the coupling sleeve 4, even when the first outer thread 12 and the first inner thread 10 do not assure a self-blocking effect. In the embodiment represented, the additional axial stop surface 24 is defined by a flank of an annular heel 25 projecting radially towards the interior of the coupling sleeve 4.

Although the invention has been described in association with a plurality of particular embodiments, it is apparent that it is in no way limited to this, and that it comprises all the technical equivalents of the means described, as well as their combinations, if these come within the scope of the invention.

The use of the verbs "comprise", "contain" or "include" and their conjugated forms does not exclude the presence of elements or steps other than those described in a claim.

In the claims, any reference numeral in brackets can not be interpreted as a limitation of the claim.

The invention claimed is:

1. A connection device comprising:

a first tubular element, a second tubular element, and a coupling sleeve in order to connect the first tubular element and the second tubular element, the coupling sleeve having a first female portion and a second female portion having respectively a first inner thread and a second inner thread, the first tubular element and the second tubular element having respectively a first male portion and a second male portion, the first male portion and the second male portion having respectively a first outer thread which is configured to cooperate with the first inner thread of the coupling sleeve, and a second outer thread which is configured to cooperate with the second inner thread of the coupling sleeve, such as to permit coupling by screwing of the first male portion to the interior of the first female portion and of the second male portion to the interior of the second female portion, the first male portion comprising a free end having a first axial stop surface, the second male portion having a free end comprising a second axial stop surface and an outer sealing surface extending between the second axial stop surface and the second outer thread, the second axial stop surface being configured to come into contact against the first axial stop surface when the first male portion and the second male portion are coupled respectively in a coupling position in the interior of the first female portion and the second female portion, the free end of the first male portion also comprising an annular sealing lip, projecting axially relative to the first axial stop surface, the sealing lip being configured to cover the outer sealing surface and to come into sealed radial contact against said outer sealing surface when the first axial stop surface and the second axial stop surface are in contact against one another, the sealing lip having an outer periphery on which part of the first outer thread is provided, wherein the first outer thread has a conical portion and a cylindrical portion which is positioned axially between the conical portion of the first outer thread and the free end of the first male portion, such that the cylindrical portion is at least partly arranged on the sealing lip.

2. The connection device according to claim 1, wherein the first outer thread comprises threading which has an engagement flank facing towards the free end of the first male portion, and a support flank facing in the opposite direction, the first or second outer thread comprising an area which is stressed axially, extending, starting from the free end of the male portion, between a first area in which axial interference begins between the engagement flank and a corresponding surface of the first inner thread, and a second area starting from which the engagement flank is not in interference against a corresponding surface of the first inner thread, whereas the support flank is in interference against a corresponding area of the first inner thread.

3. The connection device according to claim 2, wherein the axial stressed area comprises between 1 and 4 teeth.

4. The connection device according to claim 1, wherein the coupling sleeve comprises an additional axial stop surface which projects radially towards the interior of the coupling sleeve, from a median portion situated between the first inner thread and the second inner thread, the sealing lip being configured to come into contact against the additional axial stop surface in the coupling position.

5. The connection device according to claim 4, wherein an end tooth of the first outer thread is configured to come into contact against the additional axial stop surface in the coupling position, a radial height of the additional stop surface being equal to, or greater than, half a radial height of the end tooth.

6. The connection device according to claim 1, wherein the second outer thread is frusto-conical, and the second inner thread is frusto-conical.

7. The connection device according to claim 1, wherein the coupling sleeve comprises a median portion without a thread which is positioned between the first inner thread and the second inner thread.

8. The connection device according to claim 7, wherein the median portion has an axial length which is equal to, or greater than, one times a thread pitch of the first outer thread.

9. The connection device according to claim 7, wherein, in the coupling position, an end of the median portion is interposed axially between a free end of the sealing lip and the first axial stop surface.

10. The connection device according to claim 7, wherein said median portion is positioned such that, when the first axial stop surface and the second axial stop surface are in contact against one another in the coupling position, the sealing lip is in radial contact against the outer sealing surface which is radially in the interior of the median portion.

11. The connection device according to claim 1, wherein the first tubular element, the second tubular element, and the coupling sleeve are made of steel.

12. The connection device according to claim 1, wherein the first outer thread is in contact against the first inner thread on areas of interference having a level of interference which is greater than the level of interference of the second outer thread against the second inner thread.

* * * * *